(12) United States Patent
Liao et al.

(10) Patent No.: US 10,768,767 B2
(45) Date of Patent: Sep. 8, 2020

(54) TOUCH DETECTION CHIP AND TOUCH SCREEN DETECTION METHOD

(71) Applicant: SHENZHEN GOODIX TECHNOLOGY CO., LTD., Shenzhen, Guangdong (CN)

(72) Inventors: Guanliang Liao, Shenzhen (CN); Qiu Zhou, Shenzhen (CN); Wenhe Jin, Shenzhen (CN); Yufeng Liu, Shenzhen (CN)

(73) Assignee: Shenzhen Goodix Technology Co., LTD., Shenzhen, Guangdong (CN)

(*) Notice: Subject to any disclaimer, the term of this patent is extended or adjusted under 35 U.S.C. 154(b) by 0 days.

(21) Appl. No.: 16/421,396

(22) Filed: May 23, 2019

(65) Prior Publication Data
US 2019/0317628 A1 Oct. 17, 2019

Related U.S. Application Data

(63) Continuation of application No. PCT/CN2018/083094, filed on Apr. 13, 2018.

(51) Int. Cl.
*G06F 3/045* (2006.01)
*G06F 3/041* (2006.01)

(52) U.S. Cl.
CPC .......... *G06F 3/045* (2013.01); *G06F 3/0412* (2013.01); *G06F 3/0416* (2013.01)

(58) Field of Classification Search
CPC ....... G06F 3/045; G06F 3/0412; G06F 3/0416
(Continued)

(56) References Cited

U.S. PATENT DOCUMENTS 6,194,888 B1 * 2/2001 Matsumoto ........ G01R 27/2605
  323/364
8,810,263 B1   8/2014 Wilson et al.
(Continued)

FOREIGN PATENT DOCUMENTS

CN   106502451 A   3/2017
CN   107045401 A   8/2017
(Continued)

OTHER PUBLICATIONS

International Search Report mailed in International Patent Application No. PCT/CN2018/083094, filed on Apr. 13, 2018, 4 pages.
(Continued)

*Primary Examiner* — Chanh D Nguyen
*Assistant Examiner* — Ngan T. Pham-Lu
(74) *Attorney, Agent, or Firm* — Davis Wright Tremaine LLP

(57) ABSTRACT

The present disclosure provides a touch detection chip and a touch screen detection method. The touch detection chip includes: a signal output unit configured to output a driving signal to a first channel of a touch screen; a first analog front end circuit, an inverting input end of which being connected to the first channel; a second analog front end circuit, an inverting input end of which being connected to a second channel of the touch screen; an impedance-adjustable circuit connected between a non-inverting input end of the first analog front end circuit and the signal output unit; a DC voltage unit connected to a non-inverting input end of the second analog front end circuit; and a processing unit separately connected to the signal output unit, the first analog front end circuit and the second analog front end circuit.

20 Claims, 6 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2016/0026299 A1* | 1/2016 | Kitada | G06F 3/044 345/174 |
| 2017/0364184 A1 | 12/2017 | Weinerth et al. | |
| 2018/0032176 A1 | 2/2018 | Krah et al. | |
| 2018/0059870 A1 | 3/2018 | Krah | |
| 2018/0164943 A1* | 6/2018 | Hung | G06F 3/0416 |

FOREIGN PATENT DOCUMENTS

| | | |
|---|---|---|
| CN | 107690584 A | 2/2018 |
| KR | 20160058273 A | 5/2016 |

OTHER PUBLICATIONS

Extended European Search Report dated Nov. 20, 2019, Patent Application No. 18877309.7-1231, filed May 22, 2019, 8 pages.

\* cited by examiner

TOUCH DETECTION CHIP AND TOUCH SCREEN DETECTION METHOD

CROSS REFERENCE TO RELATED APPLICATIONS

The present application is a continuation of international application No. PCT/CN2018/083094, filed on Apr. 13, 2018, which is hereby incorporated by reference in its entirety.

TECHNICAL FIELD

The present disclosure relates to the field of detection technology, especially to a touch detection chip and a touch screen detection method.

BACKGROUND

At present, a main method for detecting whether there is a water drop on a touch screen is alternate coding detection, the principle of which is as follows. All the channels of the touch screen are uniformly numbered and the number starts with 0. For example, a driving signal is applied to an even channel, while an odd channel is set to be floating (i.e. no driving signal is applied to the odd channel). When there is no water drop or hand touch, one frame of data is sampled and serve as reference values. When only water drop exists, a sample value detected in the even channel gets smaller because partial signals are coupled through the water drop to an odd channel adjacent to the even channel. Therefore, a difference value (i.e., a value obtained by subtracting the detection sample value from the reference value) of the even channel is a positive value. At this time, a sample value detected in the odd channel becomes larger due to coupled signals from the even channel, and then a difference value of the odd channel is a negative value.

In setting the reference values, the odd channel is set to be floating, driving signal is applied to the even channel (i.e. the coding channel), and a direct current (DC) voltage is input to each non-inverting input end of a differential programmable gain amplifier (PGA) corresponding to each channel. At this time, one frame of data is sampled from each channel through an inverting input end of each PGA, and the frame of data is processed to be as the reference values. That is, in setting the reference values, a DC component is subtracted from a driving signal via hardware by inputting a DC voltage to the non-inverting input end of the PGA.

SUMMARY

Some embodiments of the present disclosure are to provide a touch detection chip and a touch screen detection method, which may improve a signal-to-noise ratio and sensitivity of the touch screen detection to some extent.

An embodiment of the present disclosure provides a touch detection chip. The touch detection chip includes: a signal output unit configured to output a driving signal to a first channel of a touch screen in a water drop detection mode; a first analog front end circuit comprising an inverting input end connected to the first channel, where the first analog front end circuit is configured to receive a detection signal from the first channel, and outputs a detected value of the first channel according to the detection signal received from the first channel; a second analog front end circuit comprising an inverting input end connected to a second channel of the touch screen, where the second channel is adjacent to the first channel and the second channel is left floating in the water drop detection mode, where the second analog front end circuit is configured to receive a detection signal from the second channel, and outputs a detected value of the second channel according to the detection signal received from the second channel; an impedance-adjustable circuit connected between a non-inverting input end of the first analog front end circuit and the signal output unit, wherein the impedance-adjustable circuit comprises a preset impedance value; a DC voltage unit connected to a non-inverting input end of the second analog front end circuit; and a processing unit; where the signal output unit, an output end of the first analog front end circuit, and an output end of the second analog front end circuit are connected to the processing unit respectively, where the processing unit is configured to process the detected value of the first channel and the detected value of the second channel to obtain a water drop detection result.

An embodiment of the present disclosure provides a touch screen detection method. The detection method includes as follows: a signal output unit of a touch detection chip outputs a driving signal to a first channel of a touch screen and an impedance-adjustable circuit of the touch detection chip in the water drop detection mode of the touch detection chip, where the impedance-adjustable circuit comprises a preset impedance value; an inverting input end of a first analog front end circuit of the touch detection chip receives a detection signal from the first channel, and outputs a detected value of the first channel according to the detection signal received from the first channel; and an inverting input end of a second analog front end circuit of the touch detection chip receives a detection signal from a second channel of the touch screen, and outputs a detected value of the second channel according to the detection signal received from the second channel, where the second channel is adjacent to the first channel and the second channel is floating in the water drop detection mode; and a processing unit obtains a water drop detection result of the touch screen according to the detected value of the first channel, a reference value of the first channel, the detected value of the second channel, and a reference value of the second channel.

Compared with existing technology, in the embodiments of the present disclosure, an impedance-adjustable circuit is connected between the non-inverting input end of the first analog front end circuit and the signal output unit which is configured to output the driving signal to a first channel of the touch screen in the water drop detection mode. Since an impedance value of the impedance-adjustable circuit is adjustable, at least partial AC signals among the driving signal may be offset by adjusting the impedance value of the impedance-adjustable circuit, so as to prevent the first analog front end circuit from not being able to work normally because of premature saturation resulted from an effect of large AC signals. In other words, by offsetting at least partial AC components of the driving signals by the impedance-adjustable circuit, an amplifying coefficient of the first analog front end circuit may be set as being large, so that a signal-to-noise ratio and sensitivity of the touch screen detection may be improved to some extent.

Further, the first channel refers to any odd channel of the touch screen and the second channel refers to any even channel of the touch screen; or wherein the first channel refers to any even channel of the touch screen and the second channel refers to any odd channel of the touch screen. This embodiment provides specific methods for selecting the first channel and the second channel.

Further, the impedance-adjustable circuit has the preset impedance value configured to cause the absolute value of the detected value of the first analog front end circuit reaches the minimum by adjusting the impedance value of the impedance-adjustable circuit within an adjustable scope of the impedance-adjustable circuit when the driving signal is applied to the impedance-adjustable circuit and the first channel in a water-free and touch-free state of the touch screen. This embodiment provides a specific method for setting a preset impedance value of an impedance-adjustable circuit. The impedance value of the impedance-adjustable circuit is adjusted to offset the AC signal in the driving signal to the greatest extent by using the impedance-adjustable circuit, so that an absolute value of the reference value of the first channel is as small as possible. Therefore, the amplifying coefficient of the first analog front end circuit may be set as large as possible, being able to amplify the effective differential signal in the first analog front end circuit by a large magnification, so as to prevent to the largest extent the effective differential signal from being drown by noise signals, thereby improving the signal-to-noise ratio and sensitivity detected to the largest extent.

Further, the impedance-adjustable circuit includes an adjustable resistor and an adjustable capacitor; a first end of the adjustable resistor is connected to the signal output unit, a second end of the adjustable resistor is connected to the non-inverting input end of the first analog front end circuit, and the second end of the adjustable resistor is grounded via the adjustable capacitor. This embodiment of the present disclosure provides a specific structure of an impedance-adjustable circuit.

Further, the number of first channels is greater than the number of first analog front end circuits, the number of second channels is greater than the number of second analog front end circuits; where the first channel multiplexes the first analog front end circuit; and where the second channel multiplexes the second analog front end circuit. In this embodiment of the present disclosure, numbers of the first analog front end circuits and second analog front end circuits are reduced by using a multiplexer to multiplex the first analog front end circuits and second analog front end circuits, so that the area and cost of the touch detection chip are reduced.

Further, the first analog front end circuit comprises a differential amplifier, a filter sub-circuit, and a sampling sub-circuit which are connected in sequence. A non-inverting input end and an inverting input end of the differential amplifier are configured respectively as the non-inverting input end and the inverting input end of the first analog front end circuit. An output end of the sampling sub-circuit is used as the output end of the first analog front end circuit. The second analog front end circuit is the same as the first analog front end circuit in structure. This embodiment of the present disclosure provides a specific structure of the first analog front end circuit and a specific structure of the second analog front end circuit.

Further, a method for setting the reference value of the first channel comprises: the signal output unit outputs the driving signal to the first channel and the impedance-adjustable circuit when the touch screen is in the water-free and touch-free state; the processing unit adjusts an impedance value of the impedance-adjustable circuit, and records an output value of the first analog front end circuit; the processing unit identifies an output value with a minimum absolute value from each output value of the first analog front end circuit, and sets the output value with the minimum absolute value as the reference value of the first channel; and where the impedance value corresponding to the output value with the minimum absolute value is a preset impedance value. This embodiment of the present disclosure provides a specific method for setting the reference value of the first channel. The impedance value of the impedance-adjustable circuit is adjusted to offset the AC signal in the driving signal to the greatest extent by using the impedance-adjustable circuit, so that an absolute value of the reference value of the first channel is as small as possible. Therefore, the amplifying coefficient of the first analog front end circuit may be set as large as possible, being able to amplify the effective differential signal in the first analog front end circuit by a large magnification, so as to prevent to the largest extent the effective differential signal from being drown by noise signals, thereby improving the signal-to-noise ratio and sensitivity detected to the largest extent.

A method for determining that the touch screen is in the water-free and touch-free state includes: the processing unit performs touch detection on the touch screen in a mutually capacitive manner, and obtains a touch value of each receiving channel of the touch screen; the processing unit determines whether there is the finger touch according to the touch value of each receiving channel, and determines that the touch screen is in the water-free and touch-free state if there is no finger touch. This embodiment of the present disclosure provides a specific method for determining whether the touch screen is in the water-free and touch-free state.

Further, a method for determining that the touch screen is in the water-free and touch-free state includes: the processing unit performs touch detection on the touch screen, obtains a touch value of the first channel through the first analog front end circuit, and obtains a touch value of the second channel through the second analog front end circuit; the processing unit determining whether there is a finger touch according to the touch value of the first channel and the touch value of the second channel; if there is no finger touch, the processing unit connects the non-inverting input end of the first analog front end circuit to the DC voltage unit, and controls the signal output unit to output the driving signal to the first channel; the inverting input end of the first analog front end circuit receives the detection signal from the first channel, and outputs the detected value of the first channel according to the detection signal received from the first channel; and the inverting input end of the second analog front end circuit receives a detection signal from the second channel, and outputs a detected value of the second channel according to the detection signal received from the second channel; and the processing unit determines that the touch screen is in the water-free and touch-free state, if the processing unit determines that the detected value of the first channel matches the touch value of the first channel and the difference between the detected value of the second channel and the touch value of the second channel is greater than a preset difference. This embodiment of the present disclosure provides another specific method for determining whether the touch screen is in the water-free and touch-free state.

Further, the processing unit obtains the water drop detection result of the touch screen according to the detected value of the first channel, the reference value of the first channel, the detected value of the second channel, and the reference value of the second channel, which includes: it is obtained that a result of the water drop detection is that a water drop exists, if the processing unit determines that the detected value of the first channel is smaller than the reference value of the first channel and the detected value of the second channel is greater than the reference value of the second channel. This embodiment of the present disclosure provides a specific implementation method for analyzing whether there is a water drop in the touch screen.

Further, there are a plurality of the first channels, the signal output unit outputs the driving signal to the first channels and impedance-adjustable circuits, and the signal output unit simultaneously outputs the driving signal to each of the first channels and each of the impedance-adjustable circuits. In this embodiment of the present disclosure, since the signal output unit simultaneously outputs the driving signal to each of the first channels and each of the impedance-adjustable circuits, time for water drop detection may be shortened.

Further, the touch detection chip includes the water drop detection mode and a touch detection mode, the touch detection chip being switchable between the water drop detection mode and the touch detection mode. In this embodiment of the present disclosure, the touch detection chip may be switched between implementing varied functions.

Further, prerequisites for the touch detection chip to enter the water drop detection mode include: the touch screen is at the touch detection mode and abnormality occurs to obtained touch detection data, or the touch screen is awaken. In this embodiment of the present disclosure, conditions for triggering the touch detection chip to be switched to the water drop detection mode are provided.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

Figure 1:
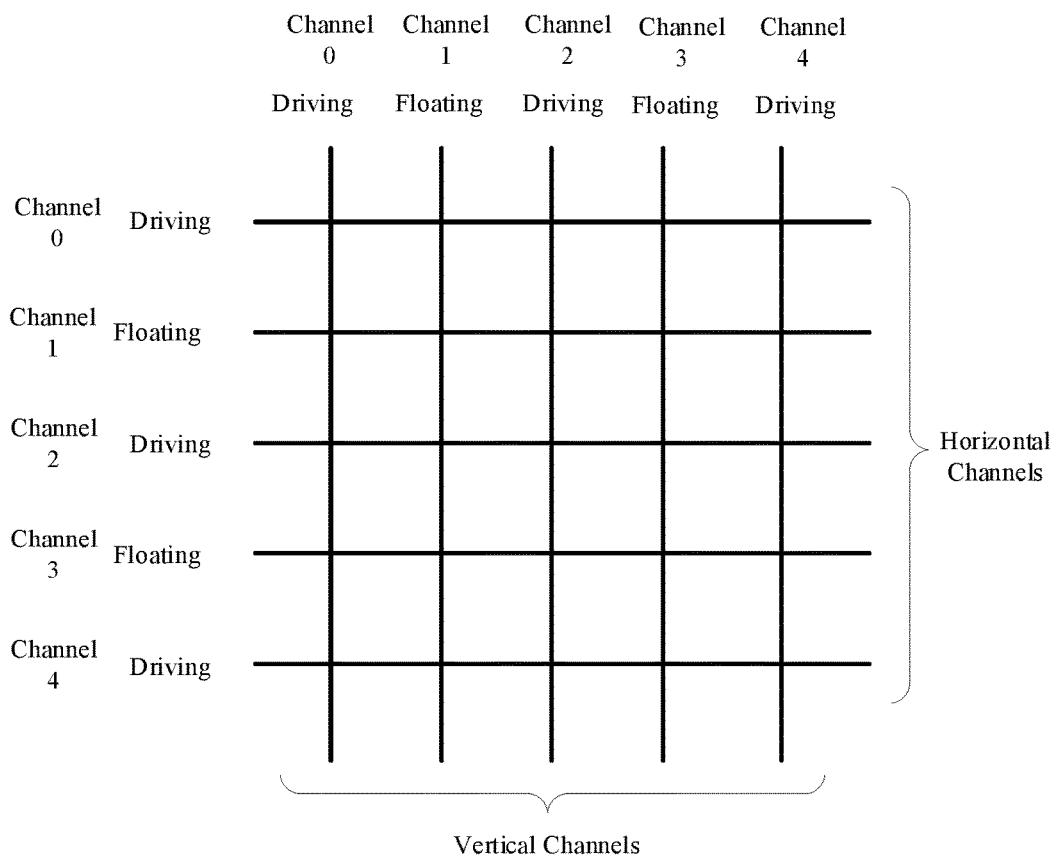
FIG. 1 is a schematic diagram of a touch screen according to a first embodiment of the present disclosure.

In order to make the purpose, the technical solution and the advantages of the present disclosure clearer, some embodiments of the present disclosure will be explained below in detail with reference to the accompanying drawings and embodiments. It shall be understood that the specific embodiments described here only explain the application but do not impose a limitation to the application.

The inventor(s) find that at least the following problems exist in the existing technologies: for a coding channel, an input driving signal includes an alternate current (AC) signal in addition to a DC component. However, presently, only the DC component is introduced to a non-inverting input end of the PGA to subtract the DC component from the driving signal, but a larger AC component in the driving signal is not processed. As a result, a basic amount of the driving signal is still very large, easily leading to saturation of PGA at a back end and the PGA cannot work at an optimal working point. Therefore, in order to make the PGA work in a linear range, it is necessary to set a PGA amplifying coefficient small, resulting in that a detected difference value of the channel is small. Such that it is difficult to distinguish whether the small difference value is caused by an external noise or due to the presence of a water drop, and signal to noise ratio and sensitivity are relatively low.

A first embodiment of the present disclosure relates to a touch detection chip, which includes: a signal output unit configured to output a driving signal to a first channel of a touch screen in a water drop detection mode; a first analog front end circuit, an inverting input end of which being connected to the first channel; a second analog front end circuit, an inverting input end of which being connected to a second channel of the touch screen, where the second channel is adjacent to the first channel and the second channel is left floating in the water drop detection mode; an impedance-adjustable circuit connected between a non-inverting input end of the first analog front end circuit and the signal output unit; a DC voltage unit connected to a non-inverting input end of the second analog front end circuit; and a processing unit separately connected to the signal output unit, an output end of the first analog front end circuit, and an output end of the second analog front end circuit.

Compared with existing technology, in this embodiment, an impedance-adjustable circuit is connected between the non-inverting input end of the first analog front end circuit and the signal output unit which is configured to output the driving signal to a first channel of the touch screen in the water drop detection mode. Since an impedance value of the impedance-adjustable circuit is adjustable, at least partial AC signals among driving signals may be offset by adjusting the impedance value of the impedance-adjustable circuit, so as to prevent the first analog front end circuit from not being able to work normally because of premature saturation resulted from an effect of large AC signals. In other words, by offsetting at least partial AC components of the driving signals by the impedance-adjustable circuit, an amplifying coefficient of the first analog front end circuit may be set as being large, so that a signal-to-noise ratio and sensitivity of the touch screen detection may be improved to some extent.

Implementation details of the touch detection chip in this embodiment are specifically described below. The following content is only implementation details provided to facilitate understanding, but are not indispensable for implementing this solution. The touch detection chip in this embodiment is configured to detect the touch screen. All channels of the touch screen may be divided into odd channels and even channels. With reference to FIG. 1, the touch screen includes a plurality of horizontal channels (being horizontally arranged) and a plurality of vertical channels (being vertically arranged), the plurality of horizontal channels being parallel to each other, the plurality of vertical channels being parallel to each other, and the horizontal channels and the vertical channels being mutually perpendicular.

The touch screen in this embodiment is described by taking the touch screen shown in FIG. 1 for example, in which a plurality of horizontal channels are numbered starting with 0 and a plurality of vertical channels are numbered starting with 0. The horizontal channels include channel 0, channel 1, channel 2, channel 3 and channel 4, wherein channel 1 and channel 3 are odd channels, while channel 0, channel 2 and channel 4 are even channels. Similarly, the vertical channels include channel 0, channel 1, channel 2, channel 3 and channel 4, wherein channel 1 and channel 3 are odd channels, while channel 0, channel 2, and channel 4 are even channels. It shall be noted that only five horizontal channels and five vertical channels are schematically illustrated in FIG. 1, but FIG. 1 is just an exemplary illustration that imposes no limitation to the numbers of the horizontal channels and vertical channels.

Figure 2:
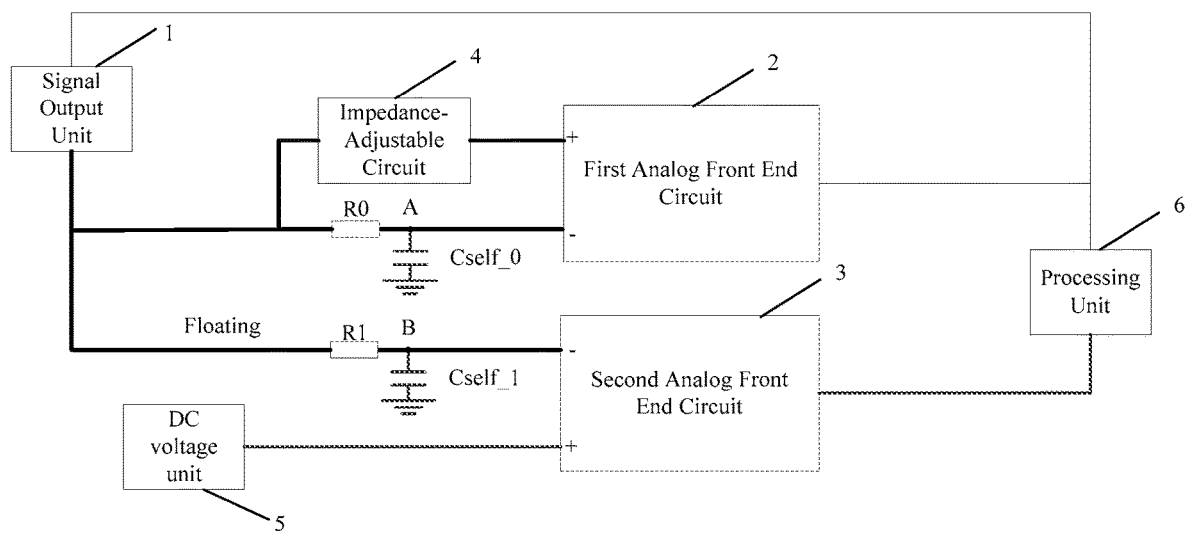
FIG. 2 is a schematic diagram of a touch detection chip according to a first embodiment of the present disclosure.

The touch detection chip in this embodiment, as shown in FIG. 2, includes a signal output unit 1, a first analog front end circuit 2, a second analog front end circuit 3, an impedance-adjustable circuit 4, a DC voltage unit 5 and a processing unit 6. A detection branch of the first channel includes the signal output unit 1, the impedance-adjustable circuit 4 and the first analog front end circuit 2. A detection branch of the second channel includes the signal output unit 1, the DC voltage unit 5, and a second analog front end circuit 3. It should be noted that only a detection branch of one first channel and a detection branch of one second channel are shown in FIG. 2 for illustration.

The touch detection chip in this embodiment at least includes a water drop detection mode and a touch detection mode. The touch detection chip may be switched between the water drop detection mode and the touch detection mode.

When the touch detection chip is switched to the water drop detection mode, either one of adjacent channels of the touch screen may be used as the first channel and the other channel as the second channel. Preferably, all the odd channels of the touch screen will be used as first channels, and all the even channels of the touch screen are used as second channels. Alternatively, all the even channels of the touch screen may be used as the first channels, and all the odd channels of the touch screen may be used as the second channels. In the water drop detection mode, the signal output unit 1 simultaneously outputs a driving signal to the first channels, and the second channel is in a floating state. The second channel being in the floating state means that there is no signal connection between the second channels and the signal output unit 1(a connection line between the signal output unit 1 and a second channel is shown in FIG. 2, but in the water drop detection mode, no signal is transmitted from the signal output unit 1 to the second channel, that is, the signal output unit 1 does not output a driving signal to the second channel).

In this embodiment and subsequent embodiments, that all the even channels of the touch screen are used as the first channels (i.e., channel 0, channel 2 and channel 4 in FIG. 1) and all the odd channels of the touch screen are used as the second channels (i.e., channel 1 and channel 3 in FIG. 1) is taken as an example for illustration.

It shall be noted that, there may be the following methods in other examples. Take FIG. 1 for example. One of channel 0 and channel 1 (or channel 1 and channel 2, or channel 2 and channel 3, or channel 3 and channel 4) is used as the first channel, while the other channel as the second channel. In this way, the signal output unit 1 sequentially outputs the driving signals to the first channels, while the second channels are in a floating state.

The number of first analog front end circuits 2 may be the same as the number of the first channels of the touch screen, and the number of second analog front end circuits 3 may be the same as the number of the second channels of the touch screen.

Alternatively, when the number of the first channels and the number of the second channels are large, the first analog front end circuits 2 and the second analog front end circuits 3 may be multiplexed. The first channels multiplex the first analog front end circuits 2. The second channels multiplex the second analog front end circuits 3. In practical, the touch detection chip includes multiplexers, the first channels multiplex the first analog front end circuits 2 by corresponding multiplexer and the second channels multiplex the second analog front end circuits 3 by corresponding multiplexer. For example, when the number of the first channels is 36 and the number of the second channels is 36 (the total number of the first channels and second channels is 72), the number of the first analog front end circuits 2 and the number of the second analog front end circuits 3 may both be 18, and thus 36 first channels multiplex 18 first analog front end circuits 2 by the multiplexer, and 36 second channels multiplex 18 second analog front end circuits 3 by the multiplexer.

As shown in FIG. 2, the signal output unit 1 is configured to be connected to the first channel, an inverting input end of the first analog front end circuit 2 is configured to be connected to a first channel. A non-inverting input end of the first analog front end circuit 2 is connected to the signal output unit 1 through the impedance-adjustable circuit 4. In FIG. 2, a reference sign A denotes a connection point of the inverting input end of the first analog front end circuit 2, the signal output unit and the first channel. A resistor $R_0$ is an equivalent impedance (i.e., an input impedance of the first channels) of a part from the signal output unit 1 to the connection point A. A capacitance $C_{self\_0}$ is a coupling capacitance between the first channel and ground.

The signal output unit 1 may further be connected to the second channel (a connection line between the signal output unit 1 and a second channel is shown in FIG. 2, but in the water drop detection mode, no signal is transmitted from the signal output unit 1 to the second channel, that is, the signal output unit 1 does not output a driving signal to the second channel), an inverting input end of the second analog front end circuit 3 is configured to be connected to the second channel, and a non-inverting input end of the second analog front end circuit 3 is connected to the DC voltage unit 5. In FIG. 2, a reference sign B denotes a connection point of the inverting input end of the second analog front end circuit 3, the signal output unit 1 and the second channel. A resistor $R_1$ is an equivalent impedance (i.e., an input impedance of the second channel) of a part from the signal output unit 1 to the connection point B. A capacitance $C_{self\_1}$ is a coupling capacitance between the second channel and ground.

It shall be noted that the resistor $R_0$ and the resistor $R_1$ in the figure are not real resistor elements, but equivalent resistances, and the capacitors $C_{self\_0}$ and $C_{self\_1}$ are not real capacitor elements, but equivalent capacitances.

Figure 3:
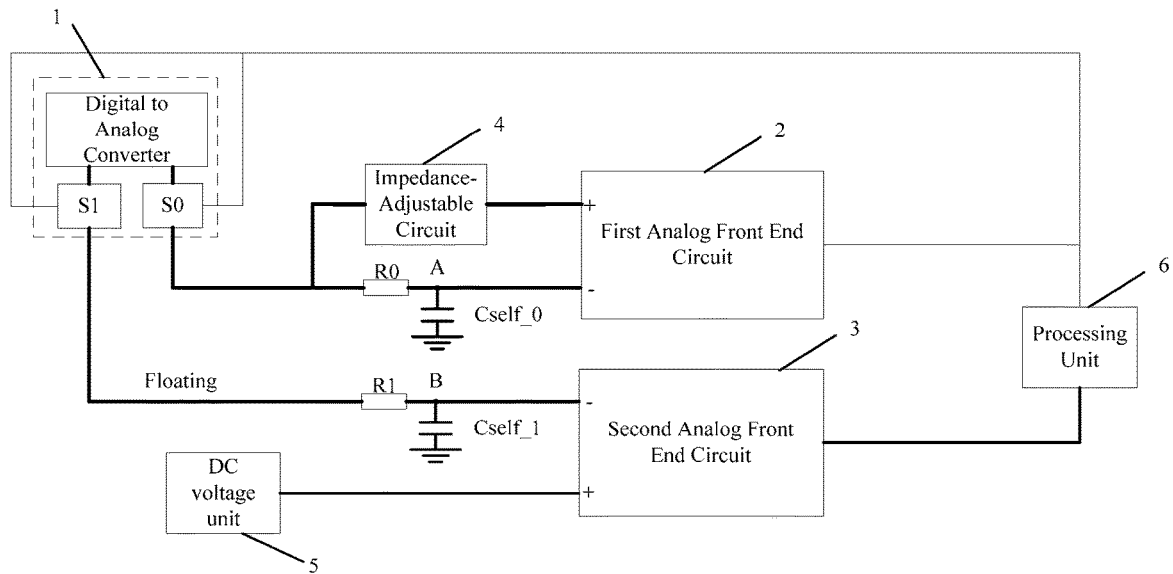
FIG. 3 is a schematic diagram of a touch detection chip according to a first embodiment of the present disclosure, wherein a signal output unit includes a digital-to-analog converter (DAC) and a switch/switches.

In one example, with reference to FIG. 3, the signal output unit 1 includes a digital to analog converter (DAC) and a switch.

In one example, output paths of the DAC and channels of the touch screen are equal to each other in number and respectively correspond to each other, and each of the output paths is connected to one channel. An output path configured to be connected to a first channel is further connected to the non-inverting input end of the first analog front end circuit 2 through the impedance-adjustable circuit 4 to output the driving signal to the non-inverting input end of the first analog front end circuit 2.

Each of the output paths of the DAC is provided with a switch which is connected to the processing unit 6, and the switch is turned on or turned off under the control of the processing unit 6 to connect or disconnect the output path. Take FIG. 3 for example. An output path of the DAC is connected to the first channel and the impedance-adjustable circuit. A switch S0 is disposed on the output path, under the control of which the driving signal may be input to the first channel and the impedance-adjustable circuit simultaneously, which is more convenient. Further, the DAC is connected to the second channel by a switch S1. The switches S0, S1 are both connected to the processing unit 6, and are turned on or turned off under the control of the processing unit 6. When the switch S1 is in the disconnected state, the second channel is made to be in the floating state.

Preferably, the DAC may otherwise be connected to the processing unit 6, so as to generate the driving signal under the control of the processing unit 6 when needed, thereby saving more power.

Figure 4:
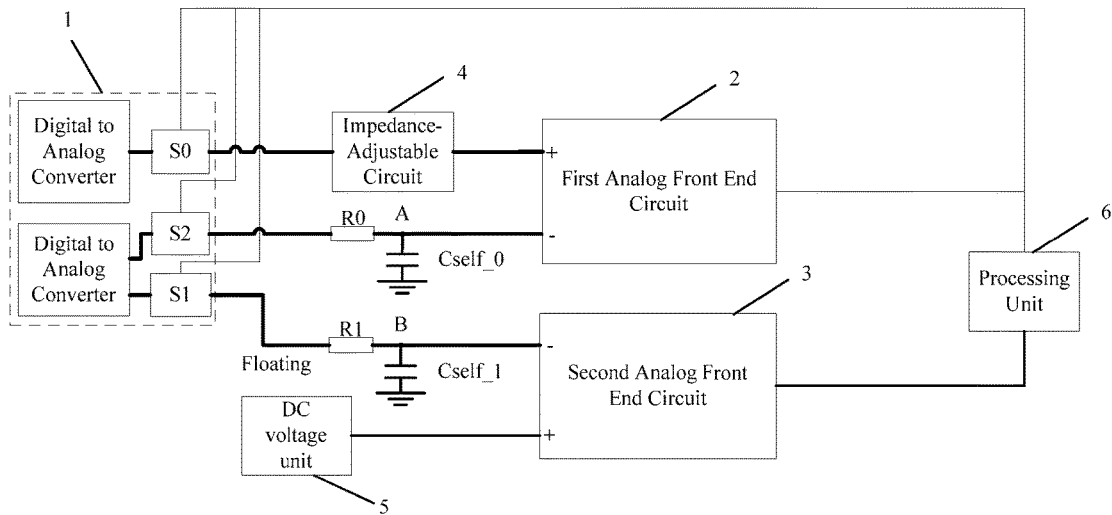
FIG. 4 is a schematic diagram of a touch detection chip according to a first embodiment of the present disclosure, wherein a signal output unit includes two digital-to-analog converters (DACs) and a switch/switches.

It shall be noted that, with reference to FIG. 4, the signal output unit 1 in this embodiment may otherwise include two DACs, one DAC being connected to the first channel by a switch S2 and to the second channel by the switch S1, while the other DAC being connected to the non-inverting input end of the first analog front end circuit 2 by the switch S0 and the impedance-adjustable circuit 4 corresponding to the first channel. At this time, it is necessary to ensure that driving signals output by the two DACs are the same in terms of frequency and amplitude. By comparison, the signal output unit 1 is provided with only one DAC, saving cost and circuit area of the touch detection chip.

The number of impedance-adjustable circuits 4 is equal to the number of the first channels of the touch screen during water drop detection. The non-inverting input end of the first analog front end circuit 2 is connected to the signal output unit 1 through one impedance-adjustable circuit 4. That is, one end of the impedance-adjustable circuit 4 is connected to the non-inverting input end of the first analog front end circuit 2, and the other end of the impedance-adjustable circuit 4 is connected to the signal output unit 1. It shall be noted that, in this embodiment, each of the first channels is disposed with one impedance-adjustable circuit 4, that is, the number of impedance-adjustable circuits 4 is equal to the number of the first channels of the touch screen during water drop detection. For example, it is assumed that the total number of channels of the touch screen is 72, and the total number of the impedance-adjustable circuits 4 is 36. When all the odd channels (36 in total) are selected as the first channels, each impedance-adjustable circuit 4 is configured to be corresponding to one of the odd channels. When all the even channels (36 in total) are selected as the first channels, each impedance-adjustable circuit 4 is configured to be corresponding to one of the even channels. However, this disclosure is not limited hereto, but each channel of the touch screen may be disposed with one impedance-adjustable circuit 4. That is, the number of the impedance-adjustable circuits 4 is equal to the number of the channels of the touch screen.

The DC voltage unit 5 is connected to the non-inverting input end of the second analog front end circuit 3 to offset the DC component in the driving signal. The magnitude of a voltage output by the DC voltage unit 5 to the non-inverting input end of the second analog front end circuit 3 is obtained in the following method. The signal output unit 1 outputs the driving signal to the second channel, the inverting input end of the second analog front end circuit 3 receives a detection signal from the second channel, and the DC voltage unit 5 outputs the voltage to the non-inverting input end of the second analog front end circuit 3. Then the voltage output from the DC voltage unit 5 is adjusted such that an absolute value of the output value of the second analog front end circuit 3 is minimized. At this time, the voltage value output from the DC voltage unit 5 may be used as the magnitude of the voltage output from the DC voltage unit 5.

In one example, the first analog front end circuit 2 includes a differential amplifier, a filter sub-circuit, and a sampling sub-circuit which are connected in sequence. The non-inverting input end and inverting input end of the differential amplifier are respectively used as the non-inverting input end and inverting input end of the first analog front end circuit, and an output end of the sampling sub-circuit is used as an output end of the first analog front end circuit. In one example, the differential amplifier is a programmable gain amplifier (PGA) for amplifying detection signals received from each of the channels. The filter sub-circuit is an adaptive funnel-shaped filter (AFF) for filtering amplified detection signals to remove noise therefrom. The sampling sub-circuit is an analog-to-digital converter (ADC) for converting filtered detection signals from analog signals to digital signals. The digital signals output by the sampling sub-circuit are defection values. The second analog front end circuit 3 has the same structure as the first analog front end circuit 2.

The processing unit 6 is separately connected to the signal output unit 1, the output end of the first analog front end circuit 2, and the output end of the second analog front end circuit 3, thereby being able to control the signal output unit 1 to output the driving signal while receiving detected values from outputs of the first analog front end circuit 2 and the second analog front end circuit 3.

In this embodiment, the impedance-adjustable circuit 4 is adjusted to a preset impedance value which is an impedance value when the absolute value of the output value of the first analog front end circuit reaches the minimum by adjusting the impedance value of the impedance-adjustable circuit within an adjustable scope of the impedance-adjustable circuit when the signal output unit 1 applies the driving signal to the impedance-adjustable circuit 4 and the first channel in a water-free and touch-free state of the touch screen. That is, when the touch screen is in the water-free and touch-free state, the signal output unit 1 simultaneously applies the driving signal to the impedance-adjustable circuit 4 and the first channel, and the processing unit 6 receives the output value from the output end of the first analog front end circuit 2, and adjusts an impedance value of the impedance-adjustable circuit 4 until the absolute value of the output value reaches the minimum (i.e., an output value is approximate to 0), so that the differential signal input to the first analog front end circuit 2 is as approximate to 0 as possible. At this time, the impedance value of the impedance-adjustable circuit 4 is just the preset impedance value. When the impedance value of the impedance-adjustable circuit 4 is adjusted to the preset impedance value, the impedance-adjustable circuit may offset an AC signal in the driving signal to the greatest extent, so that a reference value of the first channel is as small as possible. Therefore, an amplifying coefficient of the first analog front end circuit 2 may be set as large as possible, being able to amplify an effective differential signal in the first analog front end circuit 2 by a larger magnification, so as to prevent to the largest extent the effective differential signal from being drown by noise signals, thereby improving the signal-to-noise ratio and sensitivity of detection to the largest extent.

Figure 5:
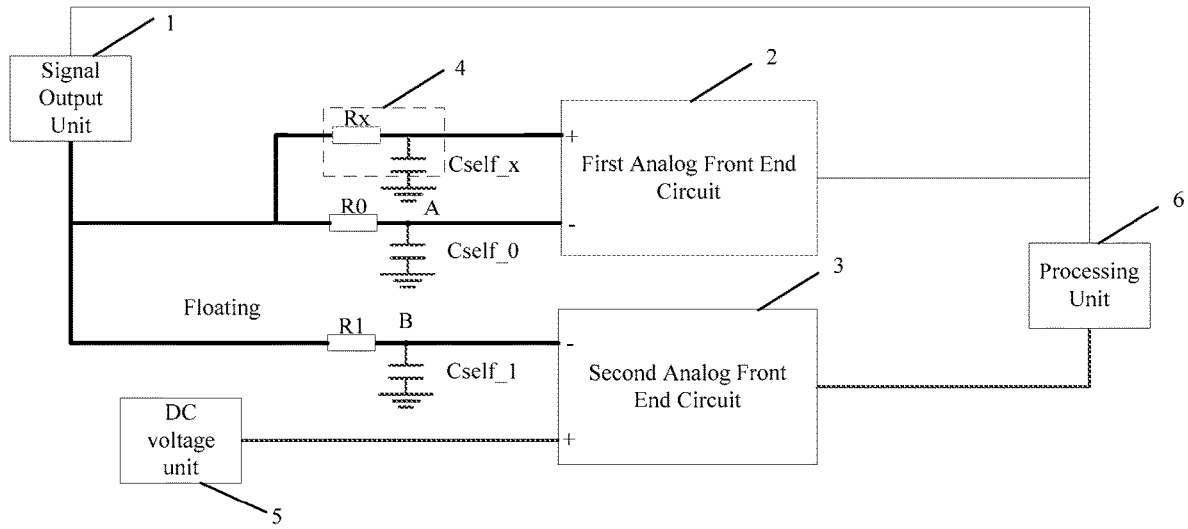
FIG. 5 is a schematic diagram of a touch detection chip according to a second embodiment of the present disclosure.

A second embodiment of the present disclosure relates to a touch detection chip, further defining the first embodiment in: with reference to FIG. 5 (the touch detection chip in FIG. 2 is taken for example, to which the present disclosure is not limited), the impedance-adjustable circuit 4 includes an adjustable resistor $R_x$ and an adjustable capacitor $C_{self\_x}$.

In this embodiment, a first end of the adjustable resistor $R_x$ is connected to the signal output unit 1, a second end of the adjustable resistor $R_x$ is connected to the non-inverting input end of the first analog front end circuit 2, and the second end of the adjustable resistor $R_x$ is further grounded via the adjustable capacitor $C_{self\_x}$.

In this embodiment, adjustment of the impedance value of the impedance-adjustable circuit 4 is implemented by adjusting the adjustable resistor $R_x$ and the adjustable capacitor $C_{self\_x}$. The adjustable resistor $R_x$ and the adjustable capacitor $C_{self\_x}$ may be adjustable in multiple gears or may be adjusted consecutively. Take a first channel for example. When trying to obtain the preset impedance value of the impedance-adjustable circuit 4, a tester first adjusts a resistance value of the adjustable resistor $R_x$ by software to match the resistance value of the resistor $R_x$ with the resistance of the resistor $R_0$ as much as possible. Then a capacitance value of the adjustable capacitor $C_{self\_x}$ is adjusted by software to match the capacitance value of the adjustable capacitor $C_{self\_x}$ with the capacitor $C_{self\_0}$ as much as possible. Accordingly, a preset impedance value of the impedance-adjustable circuit 4 may be obtained according to the resistance value of the adjustable resistor $R_x$ and the capacitance value of the adjustable capacitor $C_{self\_x}$.

This embodiment provides a specific structure of an impedance-adjustable circuit with respect to the first embodiment.

A third embodiment of the present disclosure relates to a touch screen detection method applied to the touch detection chip in the first or second embodiment. In this embodiment, the touch detection chip is switched to the water drop detection mode. In one example, there are two prerequisites for the touch detection chip to enter the water drop detection mode: first, the touch screen is in the touch detection mode and abnormality occurs to obtained touch detection data, that is, when touch detection is performed on the touch screen, a variation amount between data of two touch detections goes beyond a preset threshold; second, the touch screen is awaken.

Figure 6:
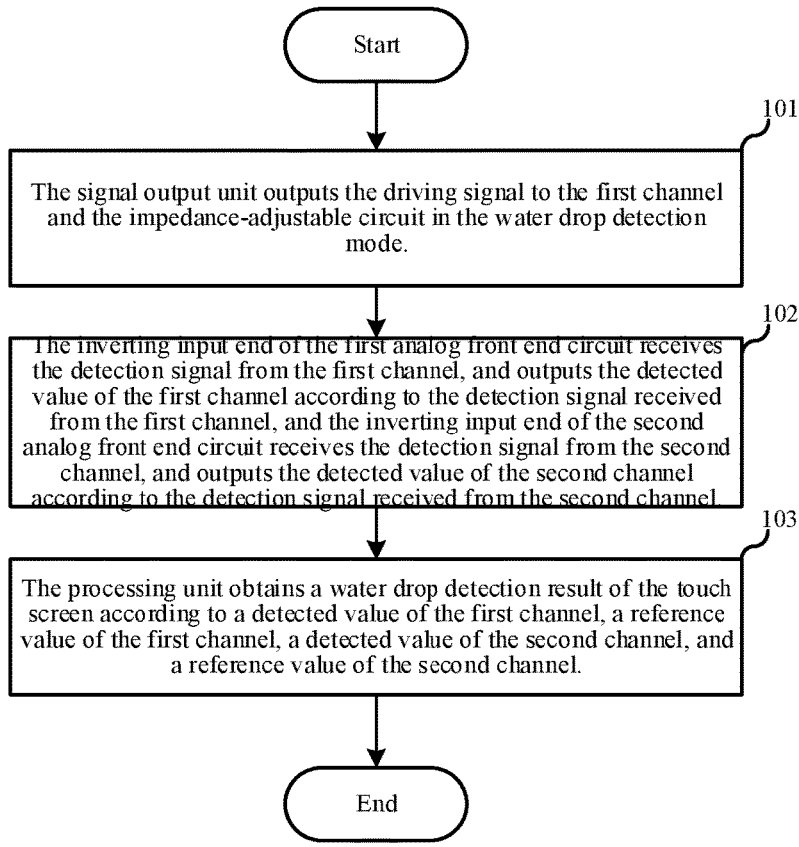
FIG. 6 is a specific flowchart of a touch screen detection method according to a third embodiment of the present disclosure.

A specific flow of the touch screen detection method is shown in FIG. 6, comprising the following steps.

In step 101, the signal output unit outputs the driving signal to the first channel and the impedance-adjustable circuit in the water drop detection mode.

Specifically, with reference also to FIG. 2, the signal output unit 1 applies a driving signal to the first channel and the impedance-adjustable circuit corresponding to the first channel. When the number of the first channels is plural, the signal output unit 1 simultaneously outputs the driving signal to the each of the first channels and the impedance-adjustable circuits corresponding to the respective first channels, so that time for water drop detection may be shortened.

In step 102, the inverting input end of the first analog front end circuit receives the detection signal from the first channel, and outputs the detected value of the first channel according to the detection signal received from the first channel, and the inverting input end of the second analog front end circuit receives the detection signal from the second channel, and outputs the detected value of the second channel according to the detection signal received from the second channel.

In step 103, the processing unit obtains a water drop detection result of the touch screen according to a detected value of the first channel, a reference value of the first channel, a detected value of the second channel, and a reference value of the second channel.

Specifically, if the processing unit 6 determines that the detected value of the first channel is smaller than the reference value of the first channel and the detected value of the second channel is greater than the reference value of the second channel, it is obtained that the result of the water drop detection is that a water drop exists. That is, if a detected value of at least one first channel is smaller than the reference value of the first channel and a detected value of at least one second channel is greater than the reference value of the second channel, it may be obtained by analysis that the result of the water drop detection is that a water drop exists. Herein, the processing unit 6 may compute difference values of the first channel and the second channel, a difference value referring to a difference (reference value subtracts detected value) between a reference value and the detected value of the channel, and thus a magnitude relationship between the detected value and the reference value of the first and the second channels may be determined.

Take the touch detection chip in FIG. 2 for example. The reference values of the first channel and the second channel are RawData_0 and RawData_1, respectively. When only a water drop exists on the touch screen, detected values of the first channel and second channel received by the processing unit 6 are RawData_2 and RawData_3, respectively. Since the water drop is a conductor, partial AC signal in a driving signal of the first channel are coupled to the second channel by the water drop. At this time, an AC signal of the inverting input end of the first analog front end circuit 2 is weakened, and an AC signal of the non-inverting input end of the first analog front end circuit 2 is greater than the AC signal of the inverting input end, resulting in that the value of the detected value RawData_2 is smaller than the reference value RawData_0, the difference value of the first channel being a positive value. The second channel is concerned with the opposite. The signal output by the second channel to the inverting input end of the corresponding second analog front end circuit 3 is increased due to the coupled AC signal. At this time, for the second analog front end circuit 3, the signal of the non-inverting input end is weaker than the signal of the inverting input end, resulting in that the value of the detected value RawData_3 is greater than the reference value RawData_1, the difference value of the second channel being a negative value.

Based on the above analysis, if the detected value of at least one first channel is smaller than the reference value of the first channel (i.e., the difference value is a negative value) and the detected value of at least one second channel is greater than the reference value of the second channel (i.e., the difference value is a positive value), it is obtained by analysis that the result of the water drop detection is that a water drop exists.

When the touch screen is only touched, or when there is a water drop on the touch screen and the touch screen is touched, partial AC signals in the first channel and the second channel flow into ground through a touching finger. At this time, the detected value of the first channel and the detected value of the second channel are both smaller than their respective reference values, that is, the difference value of the first channel and the difference value of the second channel are both positive values.

In this embodiment, the water drop detection on the touch screen is performed consecutively for a plurality of times, during which if the difference value of at least one first channel in at least one detection is negative, and the difference value of at least one second channel is negative, it is deemed that the detection result is that a water drop exists even if both starting values of the first channel and the second channel in other detections are negative values.

Since the first embodiment and the second embodiment correspond to this embodiment, this embodiment may be implemented in combination with the first embodiment and the second embodiment. Relevant technical details mentioned in the first and second embodiments are valid in this embodiment, and technical effects achieved in the first and second embodiments may also be achieved in the present embodiment. Details are not described herein to avoid repetition. Correspondingly, the relevant technical details mentioned in this embodiment may also be applied to the first embodiment and the second embodiment.

Compared with existing technology, the impedance-adjustable circuit is connected between the non-inverting input end of the first analog front end circuit and the signal output unit which is configured to output the driving signal to the first channel of the touch screen in the water drop detection mode. Since the impedance value of the impedance-adjustable circuit is adjustable, at least partial AC signals among driving signals may be offset by adjusting the impedance value of the impedance-adjustable circuit, so as to prevent the first analog front end circuit from not being able to work normally because of premature saturation resulted from the effect of large AC signals. In other words, by offsetting at least partial AC components among the driving signals by the impedance-adjustable circuit, the amplifying coefficient of the first analog front end circuit may be set large, so that the signal-to-noise ratio and sensitivity of the touch screen detection may be improved to some extent.

Figure 7:
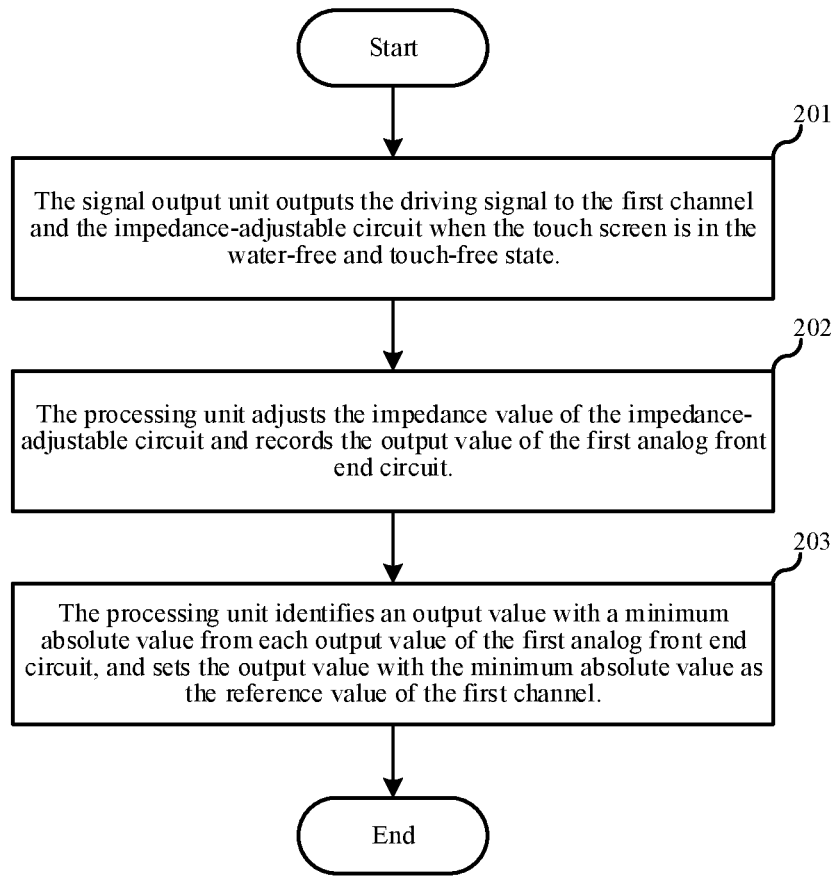
FIG. 7 is a specific flowchart of a method for setting a reference value of a first channel according to a fourth embodiment of the present disclosure.

A fourth embodiment of this disclosure relates to a touch screen detection method, which further develops the third embodiment in providing a specific method for setting the reference value of the first channel. FIG. 7 shows a method for setting the reference value of the first channel. By referring to both FIG. 7 and FIG. 2, a specific flow of the method is as follows.

In step 201, the signal output unit outputs the driving signal to the first channel and the impedance-adjustable circuit when the touch screen is in the water-free and touch-free state.

Specifically, when the touch screen is in the water-free and touch-free state, the signal output unit 1 may simultaneously apply the driving signal to each of the first channels and the impedance-adjustable circuits 4 respectively corresponding to the first channels.

In step 202, the processing unit adjusts the impedance value of the impedance-adjustable circuit and records the output value of the first analog front end circuit.

Specifically, the processing unit 6 adjusts the impedance value of each of the impedance-adjustable circuits 4 and records the output value of the first analog front end circuit 2 under the respective impedance value.

In step 203, the processing unit identifies an output value with a minimum absolute value from each output value of the first analog front end circuit, and sets the output value with the minimum absolute value as the reference value of the first channel.

Specifically, the processing unit 6 identifies the output value with the minimum absolute value from the output value of the first analog front end circuit 2, and sets the output value as the reference value of the first channel. Herein, the processing unit 6 adjusts the impedance value of the impedance-adjustable circuit 4 and stops the adjustment when the absolute value of the output value is the minimum, upon which the impedance value is used as the preset impedance value, that is, the impedance value corresponding to the output value with the minimum absolute value is the preset impedance value.

In this embodiment, the reference value of the second channel is the output value of the second analog front end circuit 3 when the touch screen is in the water-free and touch-free state and after the DC voltage unit inputs a voltage to the second analog front end circuit 3.

With respect to the third embodiment, this embodiment provides a specific method for setting the reference value of the first channel and the reference value of the second channel. When the reference value of the first channel is being set, the impedance value of the impedance-adjustable circuit is adjusted to offset the AC signal in the driving signal to the greatest extent by using the impedance-adjustable circuit, so that an absolute value of the reference value of the first channel is as small as possible. Therefore, the amplifying coefficient of the first analog front end circuit may be set as large as possible, being able to amplify the effective differential signal in the first analog front end circuit by a large magnification, so as to prevent to the largest extent the effective differential signal from being drown by noise signals, thereby improving the signal-to-noise ratio and sensitivity detected to the largest extent.

A fifth embodiment of this disclosure relates to a touch screen detection method, which further develops the fourth embodiment in providing two methods for determining whether the touch screen is in the water-free and touch-free state.

In this embodiment, there are two methods for determining whether the touch screen is in the water-free and touch-free state, which specifically is as follows.

A first method is that the processing unit 6 performs touch detection on the touch screen in a mutually capacitive manner, and obtains a touch value of each receiving channel of the touch screen. Specifically, a horizontal channel or a vertical channel of the touch screen is used as a transmitting channel, and a vertical channel or a horizontal channel of the touch screen is used as a receiving channel which is connected to the inverting input end of the first analog front end circuit 2 or second analog front end circuit 3. The non-inverting input end of the first analog front end circuit 2 or second analog front end circuit 3, that is connected to the receiving channel, is connected to the DC voltage unit 5. The signal output unit 1 inputs the driving signal to each transmitting channel. The processing unit 6 receives touch values of each receiving channel corresponding to each transmitting channel. When the processing unit 6 determines that there is no finger touch according to the touch values of the receiving channels, it means that the touch screen is in the water-free and touch-free state.

Figure 8:
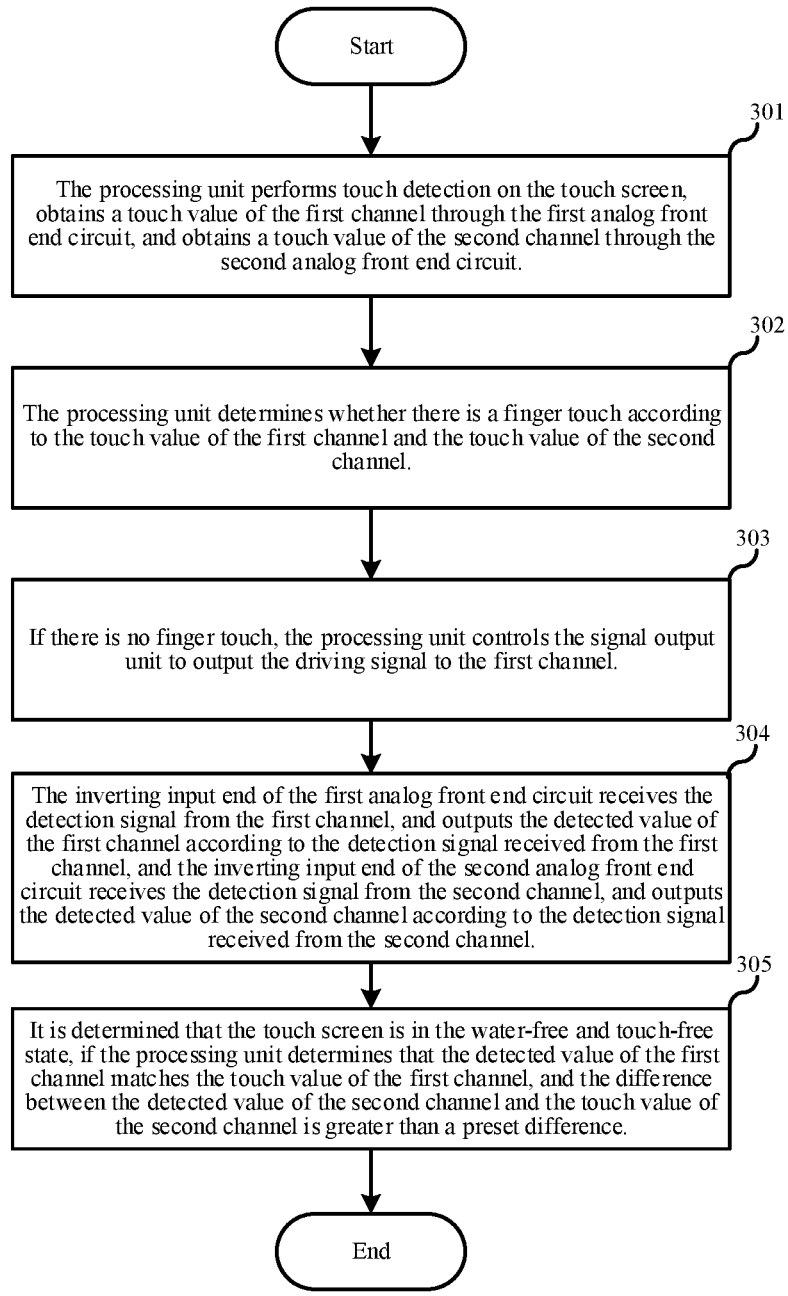
FIG. 8 is a specific flowchart of a method for determining that a touch screen is in a water-free and touch-free state according to a fifth embodiment of the present disclosure.

A second method is shown in FIG. 8 which is a flowchart of determining whether the touch screen is in the water-free and touch-free state. Both FIG. 8 and FIG. 2 are referred to in this method as follows.

In step 301, the processing unit performs touch detection on the touch screen, obtains a touch value of the first channel through the first analog front end circuit, and obtains a touch value of the second channel through the second analog front end circuit.

The touch detection chip is first switched to the touch detection mode, and the processing unit 6 performs touch detection on the touch screen. Specifically, the processing unit 6 simultaneously connects the DC voltage dividing unit 5 to the non-inverting input end of the first analog front end circuit 2 and of the second analog front end circuit 3. The inverting input end of the first analog front end circuit 2 is connected to a first channel of the touch screen. The inverting input end of the second analog front end circuit 3 is connected to the second channel of the touch screen. The signal output unit 1 inputs the driving signal to the first channel and the second channel. Therefore, a touch value of each first channel may be obtained through each first analog front end circuit 2, and a touch value of each second channel may be obtained through each second analog front end circuit 2.

In step 302, the processing unit determines whether there is a finger touch according to the touch value of the first channel and the touch value of the second channel.

Specifically, after performing a plurality of times of consecutive touch detections on the touch screen, a plurality of touch values of the first channel and a plurality of touch values of the second channel may be obtained. If there is no change between the consecutive touch values of the first channel and there is no change between the consecutive touch values of the second channel, the processing unit 6 determines that there is no finger touch; otherwise, there is a finger touch.

In step 303, if there is no finger touch, the processing unit controls the signal output unit to output the driving signal to the first channel.

Specifically, when it is determined that there is no finger touch, that is, the touch screen is in a no-touch state, the processing unit 6 controls the signal output unit 1 to output the driving signal to each of the first channels.

In step 304, the inverting input end of the first analog front end circuit receives the detection signal from the first channel, and outputs the detected value of the first channel according to the detection signal received from the first channel, and the inverting input end of the second analog front end circuit receives the detection signal from the second channel, and outputs the detected value of the second channel according to the detection signal received from the second channel.

In step 305, it is determined that the touch screen is in the water-free and touch-free state, if the processing unit determines that the detected value of the first channel matches the touch value of the first channel, and the difference between the detected value of the second channel and the touch value of the second channel is greater than a preset difference.

Specifically, the processing unit 6 computes a difference between the touch value and the detected value of the first channel, and a difference between the touch value and the detected value of the second channel. When the difference between the touch value and the detected value of the first channel is within a range of the preset difference (set by the tester based on his/her experience), it indicates that the detected value of the first channel matches the touch value of the first channel, meanwhile, if the difference between the touch value and the detected value of the second channel is greater than the preset difference (set by the tester according to his/her experience), it may be determined that the touch screen is in a water-free state, that is, the touch screen is in the water-free and touch-free state. Herein, it may be determined whether there is a water drop by using the touch value of the first channel and the touch value of the second channel in the last of a plurality of times of touch detections.

In this embodiment, as compared with the fourth embodiment, two specific methods for determining whether the touch screen is in the water-free and touch-free state.

A sixth embodiment of the present disclosure relates to a touch screen detection method. This embodiment further develops the third embodiment in that a user may configure water drop detection configuration information of the first channel by him/herself.

Figure 9:
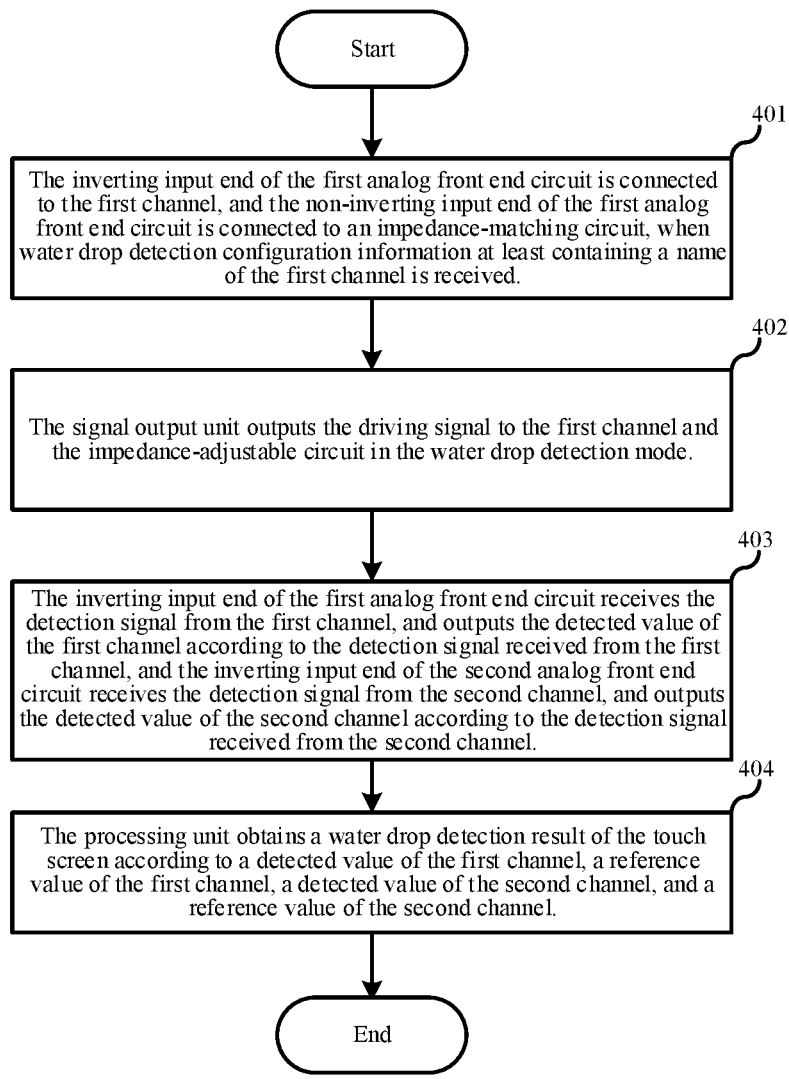
FIG. 9 is a specific flowchart of a touch screen detection method according to a sixth embodiment of the present disclosure.

A specific flow of the touch screen detection method of this embodiment is shown in FIG. 9.

Steps 402 to 404 are substantially the same as steps 101 to 103, and are not described here to avoid repetition, but a main difference is that a step 401 is added as follows.

In step 401, the inverting input end of the first analog front end circuit is connected to the first channel, and the non-inverting input end of the first analog front end circuit is connected to an impedance-matching circuit, when water drop detection configuration information at least containing a name of the first channel is received.

Specifically, the processing unit 6 connects the non-inverting input end of the first analog front end circuit 2 to the signal input unit 1 through the impedance-adjustable circuit 4 and connects the inverting input end of the first analog front end circuit 2 to the first channel, after receiving the water drop detection configuration information set by the user and including at least the name of the first channel. In this embodiment, the first channels may be set as all the odd channels or all the even channels of the touch screen.

It shall be noted that the processing unit 6 may internally store preset impedance values and reference values corresponding to each of the channels. When the first channel is selected, the impedance-adjustable circuit 4 corresponding to the first channel may be set as the preset impedance value corresponding to the first channel.

In this embodiment, compared with the third embodiment, the user may configure the water drop detection configuration information of the first channel by him/herself. It shall be noted that this embodiment may further be taken as further developing the fourth or fifth embodiment, and the same technical effects may be achieved.

Those skilled in the art may understand that the above embodiments are specific embodiments for implementing the present disclosure. In practical applications, various changes can be made in form and detail to the embodiments without departing from the spirit and scope of the present disclosure.

What is claimed is:

1. A touch detection chip, comprising:
   a signal output unit, configured to output a driving signal to a first channel of a touch screen in a water drop detection mode;
   a first analog front end circuit, comprising an inverting input end connected to the first channel, wherein the first analog front end circuit is configured to receive a detection signal from the first channel, and outputs a detected value of the first channel according to the detection signal received from the first channel;
   a second analog front end circuit, comprising an inverting input end connected to a second channel of the touch screen, wherein the second channel is adjacent to the first channel and the second channel is floating in the water drop detection mode, wherein the second analog front end circuit is configured to receive a detection signal from the second channel, and outputs a detected value of the second channel according to the detection signal received from the second channel;

an impedance-adjustable circuit, connected between a non-inverting input end of the first analog front end circuit and the signal output unit, wherein the impedance-adjustable circuit comprises a preset impedance value;

a DC voltage unit, connected to a non-inverting input end of the second analog front end circuit; and a processing unit, wherein the signal output unit, an output end of the first analog front end circuit, and an output end of the second analog front end circuit are connected to the processing unit respectively, wherein the processing unit is configured to process the detected value of the first channel and the detected value of the second channel to obtain a water drop detection result.

2. The touch detection chip according to claim 1, wherein the first channel refers to any odd channel of the touch screen and the second channel refers to any even channel of the touch screen; or wherein the first channel refers to any even channel of the touch screen and the second channel refers to any odd channel of the touch screen.

3. The touch detection chip according to claim 1, wherein the impedance-adjustable circuit has the preset impedance value configured to:

cause the absolute value of the detected value of the first analog front end circuit reaches the minimum within an adjustable scope of the impedance-adjustable circuit, when the driving signal is applied to the impedance-adjustable circuit and the first channel in a water-free and touch-free state of the touch screen.

4. The touch detection chip according to claim 1, wherein the impedance-adjustable circuit comprises:

an adjustable resistor and an adjustable capacitor;

wherein a first end of the adjustable resistor is connected to the signal output unit, a second end of the adjustable resistor is connected to the non-inverting input end of the first analog front end circuit, and the second end of the adjustable resistor is grounded via the adjustable capacitor.

5. The touch detection chip according to claim 1, wherein the number of first channels is greater than the number of first analog front end circuits, the number of second channels is greater than the number of second analog front end circuits; wherein the first channel multiplexes the first analog front end circuit; and wherein the second channel multiplexes the second analog front end circuit.

6. The touch detection chip according to claim 1, wherein the first analog front end circuit comprises a differential amplifier, a filter sub-circuit, and a sampling sub-circuit connected in sequence;

wherein a non-inverting input end and an inverting input end of the differential amplifier are configured respectively as the non-inverting input end and the inverting input end of the first analog front end circuit;

an output end of the sampling sub-circuit is configured as the output end of the first analog front end circuit; and the second analog front end circuit is the same as the first analog front end circuit in structure.

7. A touch screen detection method, comprising:

outputting, by a signal output unit of a touch detection chip, a driving signal to a first channel of a touch screen and an impedance-adjustable circuit of the touch detection chip in a water drop detection mode of the touch detection chip, wherein the impedance-adjustable circuit comprises a preset impedance value;

receiving, by an inverting input end of a first analog front end circuit of the touch detection chip, a detection signal from the first channel, and outputting a detected value of the first channel according to the detection signal received from the first channel;

receiving, by an inverting input end of a second analog front end circuit of the touch detection chip, a detection signal from a second channel of the touch screen, and outputting a detected value of the second channel according to the detection signal received from the second channel, wherein the second channel is adjacent to the first channel and the second channel is floating in the water drop detection mode; and obtaining, by a processing unit, a water drop detection result of the touch screen according to the detected value of the first channel, a reference value of the first channel, the detected value of the second channel, and a reference value of the second channel.

8. The touch screen detection method according to claim 7, wherein the first channel refers to any odd channel of the touch screen and the second channel refers to any even channel of the touch screen; or wherein the first channel refers to any even channel of the touch screen and the second channel refers to any odd channel of the touch screen.

9. The touch screen detection method according to claim 7, wherein the impedance-adjustable circuit has the preset impedance value configured to:

cause the absolute value of the detected value of the first analog front end circuit reaches the minimum within an adjustable scope of the impedance-adjustable circuit, when the driving signal is applied to the impedance-adjustable circuit and the first channel in a water-free and touch-free state of the touch screen.

10. The touch screen detection method according to claim 7, wherein the impedance-adjustable circuit comprises:

an adjustable resistor and an adjustable capacitor;

wherein a first end of the adjustable resistor is connected to the signal output unit, a second end of the adjustable resistor is connected to a non-inverting input end of the first analog front end circuit, and the second end of the adjustable resistor is grounded via the adjustable capacitor.

11. The touch screen detection method according to claim 7, wherein the number of first channels is greater than the number of first analog front end circuits, the number of second channels is greater than the number of second analog front end circuits; wherein the first channel multiplexes the first analog front end circuit; and wherein the second channel multiplexes the second analog front end circuit.

12. The touch screen detection method according to claim 7, wherein the first analog front end circuit comprises a differential amplifier, a filter sub-circuit, and a sampling sub-circuit connected in sequence;

wherein a non-inverting input end and an inverting input end of the differential amplifier are configured respectively as the non-inverting input end and the inverting input end of the first analog front end circuit; an output end of the sampling sub-circuit is configured as the output end of the first analog front end circuit; and the second analog front end circuit is the same as the first analog front end circuit in structure.

13. The touch screen detection method according to claim 7, wherein a method for setting the reference value of the first channel comprises:

outputting, by the signal output unit, the driving signal to the first channel and the impedance-adjustable circuit when the touch screen is in the water-free and touch-free state;

adjusting, by the processing unit, an impedance value of the impedance-adjustable circuit, and recording an output value of the first analog front end circuit; and identifying, by the processing unit, an output value with a minimum absolute value from each output value of the first analog front end circuit, and setting the output value with the minimum absolute value as the reference value of the first channel;

wherein the impedance value corresponding to the output value with the minimum absolute value is a preset impedance value.

14. The touch screen detection method according to claim 13, wherein a method for determining that the touch screen is in the water-free and touch-free state comprises:

performing, by the processing unit, touch detection on the touch screen, obtaining a touch value of the first channel through the first analog front end circuit, and obtaining a touch value of the second channel through the second analog front end circuit;

determining, by the processing unit, whether there is a finger touch according to the touch value of the first channel and the touch value of the second channel;

controlling, by the processing unit, the signal output unit to output the driving signal to the first channel, if there is no finger touch;

receiving, by the inverting input end of the first analog front end circuit, the detection signal from the first channel, and outputting the detected value of the first channel according to the detection signal received from the first channel;

receiving, by the inverting input end of the second analog front end circuit, a detection signal from the second channel, and outputting a detected value of the second channel according to the detection signal received from the second channel; and determining that the touch screen is in the water-free and touch-free state, if the processing unit determines that the detected value of the first channel matches the touch value of the first channel, and the difference between the detected value of the second channel and the touch value of the second channel is greater than a preset difference.

15. The touch screen detection method according to claim 13, wherein a method for determining that the touch screen is in the water-free and touch-free state comprises:

performing, by the processing unit, touch detection on the touch screen in a mutually capacitive manner, and obtaining a touch value of each receiving channel of the touch screen; and determining whether there is a finger touch according to the touch value of each receiving channel, and determining that the touch screen is in the water-free and touch-free state if there is no finger touch.

16. The touch screen detection method according to claim 13, wherein when the touch screen is in the water-free and touch-free state and before the signal output unit outputs the driving signal to the first channel and the impedance-adjustable circuit, the touch screen detection method further comprises:

connecting the inverting input end of the first analog front end circuit to the first channel, and connecting the non-inverting input end of the first analog front end circuit to an impedance-matching circuit, when water drop detection configuration information at least containing a name of the first channel is received.

17. The touch screen detection method according to claim 7, wherein the processing unit obtaining the water drop detection result of the touch screen according to the detected value of the first channel, the reference value of the first channel, the detected value of the second channel, and the reference value of the second channel, comprises:

obtaining that the water drop detection result indicates that a water drop exists, if the processing unit determines that the detected value of the first channel is smaller than the reference value of the first channel and the detected value of the second channel is greater than the reference value of the second channel.

18. The touch screen detection method according to claim 7, wherein there are a plurality of the first channel, the signal output unit simultaneously outputting the driving signal to each of the first channel and each of a respective impedance-adjustable circuit in the step of outputting, by the signal output unit, the driving signal to the first channel and impedance-adjustable circuit.

19. The touch screen detection method according to claim 7, wherein the touch detection chip comprises the water drop detection mode and a touch detection mode, the touch detection chip being switchable between the water drop detection mode and the touch detection mode.

20. The touch screen detection method according to claim 19, wherein prerequisites for the touch detection chip to enter the water drop detection mode comprise:

the touch screen being at the touch detection mode and abnormality occurring to obtained touch detection data, or the touch screen being awaken.

* * * * *